United States Patent
Zobel et al.

(10) Patent No.: US 6,784,232 B1
(45) Date of Patent: Aug. 31, 2004

(54) FLAME-RESISTANT POLYCARBONATE BLENDS

(75) Inventors: Michael Zobel, Köln (DE); Thomas Eckel, Dormagen (DE); Torsten Derr, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 60 days.

(21) Appl. No.: 10/070,015

(22) PCT Filed: Aug. 22, 2000

(86) PCT No.: PCT/EP00/08162

§ 371 (c)(1),
(2), (4) Date: Feb. 27, 2002

(87) PCT Pub. No.: WO01/18119

PCT Pub. Date: Mar. 15, 2001

(30) Foreign Application Priority Data

Sep. 2, 1999 (DE) .......................... 199 41 823

(51) Int. Cl.⁷ ............................................. C08K 5/527
(52) U.S. Cl. ........................ 524/117; 524/108; 524/139
(58) Field of Search ................................ 524/108, 117, 524/139

(56) References Cited

U.S. PATENT DOCUMENTS

| | | | |
|---|---|---|---|
| 3,505,431 A | 4/1970 | Birum | 558/126 |
| 3,711,577 A | 1/1973 | Maier | 558/158 |
| 4,054,544 A | 10/1977 | Albright | 524/124 |
| 4,073,767 A | 2/1978 | Birum | 524/118 |
| 5,061,745 A | 10/1991 | Wittmann et al. | 524/139 |
| 5,204,394 A | 4/1993 | Gosens et al. | 524/125 |
| 5,276,066 A | 1/1994 | Paulik et al. | 521/108 |
| 5,672,645 A | 9/1997 | Eckel et al. | 524/127 |
| 5,844,028 A | 12/1998 | Paulik | 524/117 |
| RE36,902 E | 10/2000 | Eckel et al. | 524/217 |
| 6,528,561 B1 * | 3/2003 | Zobel et al. | 524/125 |
| 2002/0115759 A1 * | 8/2002 | Eckel et al. | 524/115 |
| 2003/0083419 A1 * | 5/2003 | Seidel et al. | 524/451 |
| 2003/0092805 A1 * | 5/2003 | Seidel et al. | 524/127 |

FOREIGN PATENT DOCUMENTS

| | | |
|---|---|---|
| CA | 2318430 | 7/1999 |
| DE | 198 28 539 | 12/1999 |
| EP | 0 640 655 | 3/1995 |
| FR | 1371139 | 8/1964 |
| GB | 2330583 | 4/1999 |

* cited by examiner

Primary Examiner—Peter Szekely
(74) Attorney, Agent, or Firm—Joseph C. Gil; James R. Franks; Aron Preis

(57) ABSTRACT

A thermoplastic molding composition that contains a resinous blend with phosphonate amine is disclosed. The resinous blend contains polycarbonate and a graft polymer having a graft substrate rubber selected from among silicone, EP(D)M and acrylate rubbers. The composition exhibits exceptional flame resistance and good mechanical properties such as stress cracking resistance and ease of flow while exhibiting high heat resistance.

12 Claims, No Drawings

FLAME-RESISTANT POLYCARBONATE BLENDS

The present invention provides blends which contain phosphonate amines and are based on polycarbonate and graft polymers selected from the group consisting of silicone, EP(D)M and acrylate rubbers as graft substrate, which have exceptional flame resistance and very good mechanical properties such as stress cracking resistance or ease of flow while exhibiting high heat resistance.

U.S. Pat. Nos. 4,073,767 and 5,844,028 describe cyclic phosphorus compounds including phosphorinane rings as suitable flame retardants for polyurethanes, polycarbonates, polyesters and polyamides. In U.S. Pat. No. 4,397,750, specific cyclic phosphonate esters are described as efficient flame retardants for polypropylene and other polyolefins. U.S. Pat. No. 5,276,066 and U.S. Pat. No. 5,844,028 describe specific (1,3,2-dioxaphosphorinanemethane) amines which are suitable flame retardants for polyurethanes, polyesters, styrene polymers, PVC, PVAc or polycarbonate.

U.S. Pat. No. 3,505,431, FR-P 1 371 139, U.S. Pat. No. 3,711,577, U.S. Pat. No. 4,054,544 describe acyclic triphosphonate amines, some of which are halogenated.

EP-A 0 640 655 describes moulding compositions made from aromatic polycarbonate, styrene-containing copolymers and graft polymers which can be made flame resistant with monomeric and/or oligomeric phosphorus compounds.

EP-A 0 363 608 describes flame resistant polymer mixtures made from aromatic polycarbonate, styrene-containing copolymers or graft copolymers and also oligomeric phosphates as a flame resistant additive. For many applications such as, for example, in the internal sections of housings, the heat resistance of these mixtures is often inadequate.

U.S. Pat. No. 5,061,745 describes polymer mixtures made from aromatic polycarbonate. ABS graft polymers and/or styrene-containing copolymers and with monophosphates as flame retardant additives. For the production of thin-walled housing parts, the level of stress cracking resistance of these mixtures is often inadequate.

The object of the present invention is the provision of polycarbonate blends with exceptional flame resistance and exceptional mechanical properties such as stress cracking resistance, processability and ease of flow. This range of properties is demanded in particular for applications in the data processing sector such as, for example, for housings of monitors, printers, copiers, etc.

It has now been found that blends based on polycarbonate and graft polymers selected from the group consisting of silicone, EP(D)M and acrylate rubbers which contain phosphonate amines have the required properties.

The invention therefore provides blends which contain polycarbonate and/or polyestercarbonate, at least one rubber-elastic graft polymer selected from the group consisting of silicone, EP(D)M and acrylate rubbers as graft substrate and 0.1 to 30 parts by weight (with respect to the entire mixture) of phosphonate amine of the formula (I)

$$A_{3-y}-N-B_y \qquad (I),$$

in which

A represents a group of the formula (IIa)

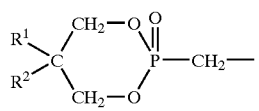

(IIa)

or (IIb)

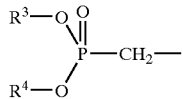

(IIb)

$R^1$ and $R^2$, independently, represent an unsubstituted or substituted $C_1$–$C_{10}$ alkyl group or an unsubstituted or substituted $C_6$–$C_{10}$ aryl group, $R^3$ and $R^4$, independently, represent an unsubstituted or substituted $C_1$–$C_{10}$ alkyl group or an unsubstituted or substituted $C_6$–$C_{10}$ aryl group or $R^3$ and $R^4$ together represent an unsubstituted or substituted $C_3$–$C_{10}$ alkylene group, y has the numerical value 0,1 or 2 and B independently, represents hydrogen, an optionally halogenated $C_2$–$C_8$ alkyl group, or an unsubstituted or substituted $C_6$–$C_{10}$ aryl group.

The invention preferably provides thermoplastic moulding compositions (blends) containing A) 40 to 99, preferably 60 to 98.5 parts by wt. of an aromatic polycarbonate and/or polyestercarbonate.

B) 0.5 to 60, preferably 1 to 40, in particular 2 to 25 parts by wt. of at least one rubber-elastic graft polymer, selected from the group consisting of silicone, EP(D)M and acrylate rubbers as graft substrate, C) 0 to 45, preferably 0 to 30, in particular 2 to 25 parts by wt. of at least one thermoplastic polymer, selected from the group consisting of vinyl (co)polymers and polyalkylene terephthalates, D) 0.1 to 30 parts by wt., preferably 1 to 25 parts by wt., in particular 2 to 20 parts by wt. of phosphonate amine of the formula (I)

$$A_{3-y}-N-B_y \qquad (I),$$

in which

A, B and y are defined in the same way as above, and

E) 0 to 5, preferably 0.1 to 3, in particular 0.1 to 1 parts by wt., quite specifically 0.1 to 0.5 parts by wt. of a fluorinated polyolefin, wherein the sum of the parts by weight of all the components is 100.

Component A

Aromatic polycarbonates and/or aromatic polyestercarbonates suitable for use according to the invention in accordance with component A are known from the literature or can be prepared by methods known from the literature (to prepare aromatic polycarbonates see, for example, Schnell, "Chemistry and Physics of Polycarbonates", Interscience Publishers, 1964 and DE-AS 1 495 626, DE-OS 2 232 877, DE-OS 2 703 376, DE-OS 2 714 544, DE-OS 3 000 610, DE-OS 3 832 396; to prepare aromatic polyestercarbonates see, for example, DE-OS 3 077 934).

Polycarbonates are prepared, for example, by reacting diphenols with carbonic acid halides, preferably phosgene and/or with aromatic dicarboxylic acid dihalides, preferably benzenedicarboxylic acid dihalides, by the phase interface method, optionally using chain stoppers; for example monophenols, and optionally using trifunctional or more than trifunctional branching agents, for example triphenols or tetraphenols.

Diphenols for preparing aromatic polycarbonates and/or aromatic polyestercarbonates are preferably those of the formula (III)

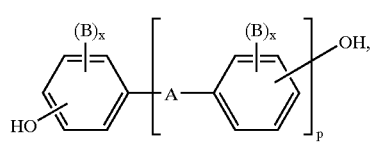

(III)

wherein

A represents a single bond, a $C_1$–$C_5$ alkylene, $C_2$–$C_5$ alkylidene, $C_5$–$C_6$ cycloalkylidene, —O—, —SO—, —CO—, —S—, —SO2, or $C_6$–$C_{12}$ arylene group, to which further aromatic rings, optionally containing heteroatoms, may be condensed, or a group of the formula (IV) or (V)

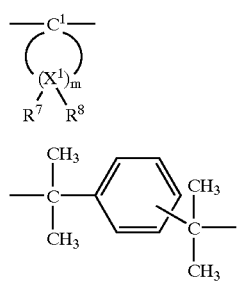

(IV)

(V)

B each represent a $C_1$–C12 alkyl group, preferably methyl or a halogen, preferably chlorine and/or bromine, x each represent, independently, 0,1 or 2, p is 1 or 0 and $R^7$ and $R^8$ can be chosen independently for each $X^1$ and represent, independently, hydrogen or a $C_1$–$C_6$ alkyl group, preferably hydrogen, methyl or ethyl, $X^1$ represents carbon and m is an integer from 4 to 7, preferably 4 or 5, with the proviso that $R^7$ and $R^8$ are simultaneously alkyl groups on at least one $X^1$ atom.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes and their ring-brominated and/or ring-chlorinated derivatives.

Particularly preferred diphenols are 4,4'-dihydroxydiphenyl, bisphenol-A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and their di- and tetrabrominated or chlorinated derivatives such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane.

2,2-bis-(4-hydroxyphenyl)-propane (bisphenol-A) is particularly preferred.

The diphenols may be used individually or as any mixture thereof.

The diphenols are known from the literature or are obtainable by methods known from the literature.

Chain stoppers which are suitable for preparing thermoplastic, aromatic polycarbonates are, for example, phenol, p-chlorophenol, p-tert.-butylphenol or 2,4,6-tribromophenol, but also long-chain alkylphenols such as 4-(1,1,3,3-tetamethylbutyl)-phenol in accordance with DE-OS 2 842 005 or monoalkylphenols or dialkylphenols with a total of 8 to 20 carbon atoms in the alkyl substituents, such as 3,5-tert.-butylphenol, p-iso-octylphenol, p-tert-octylphenol, p-dodecylphenol and 2-(3,5-dimethylheptyl)-phenol and 4-(3,5-dimethylheptyl)-phenol. The amount of chain stoppers to be used is in general between 0.5 mol % and 10 mol %, with respect to the molar sum of each of the diphenols used.

The thermoplastic, aromatic polycarbonates have mean weight-average molecular weights ($M_w$, measured, for example, by ultracentrifuge or light scattering measurements) of 10 000 to 200 000, preferably 20 000 to 80 000.

The thermoplastic, aromatic polycarbonates may be branched in a known manner, in fact preferably by incorporating 0.05 to 2.0 mol %, with respect to the sum of the diphenols used, of trifunctional or more than trifunctional compounds, for example those with three or more phenolic groups.

Both homopolycarbonates and also copolycarbonates are suitable. To prepare copolycarbonates in accordance with component A according to the invention, 1 to 25 wt. %, preferably 2.5 to 25 wt. % (with respect to the total amount of diphenols used) of polydiorganosiloxanes with hydroxy-aryloxy terminal groups may also be used. These are known (see, for example, U.S. Pat. No. 3,419,634) or can be prepared by methods known from the literature. The preparation of polydiorganosiloxane-containing copolycarbonates is described, for example, in DE-OS 3 334 782.

Preferred polycarbonates, in addition to bisphenol-A homopolycarbonates, are the copolycarbonates of bisphenol-A with up to 15 mol %, with respect to the molar sum of diphenols, other than the diphenols mentioned as preferred or particularly preferred, in particular 2,2-bis-(3,5-dibromo-4-hydroxyphenyl)-propane.

Aromatic dicarboxylic acid dihalides for preparing aromatic polyestercarbonates are preferably the diacid dichlorides of isophthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio between 1:20 and 20:1 are particularly preferred.

When preparing polyestercarbonates, a carbonic acid halide, preferably phosgene, is also used as a bifunctional acid derivative.

Suitable chain stoppers for use when preparing aromatic polyestercarbonates are, in addition to the monophenols mentioned above, their chlorocarbonates and also the acid chlorides of aromatic monocarboxylic acids, which may optionally be substituted by $C_1$–$C_{22}$ alkyl groups or by halogen atoms, and also aliphatic $C_2$–$C_{22}$ monocarboxylic acid chlorides.

The amount of each chain stopper is 0.1 to 10 mol %, with respect, in the case of phenolic chain stoppers, to the moles of diphenols and, in the case of monocarboxylic acid chloride chain stoppers, to moles of dicarboxylic acid dichlorides.

The aromatic polyestercarbonates may also contain copolymerised aromatic hydroxycarboxylic acids.

The aromatic polyestercarbonates may be either linear or branched in a known manner (with reference to this point, see also DE-OS 2 940 024 and DE-OS 3 007 934).

Branching agents which may be used are, for example trifunctional or more than trifunctional carboxylic acid chlorides such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol % (with respect to the dicarboxylic acid dichlorides used) or trifunctional or more than trifunctional phenols such as phloroglucinol, 4,6-dimethyl-2,4,6-tri-(4-hydroxyphenyl)-hept-2-ene, 4,4dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)4-methylphenol, 2-(4-hydroxyphenyl)-2-(2,4-dihydroxyphenyl)-propane, tetra-(4-[4-hydroxyphenylisopropyl]-phenoxy)-methane, 1,4-bis-[4,4'-dihydroxytriphenyl)-methyl]-benzene, in amounts of 0.01 to 1.0 mol %, with respect to the diphenols used. Phenolic branching agents may be initially introduced with the diphenols, acid chloride branching agents may be introduced together with the acid dichlorides.

In the thermoplastic, aromatic polyestercarbonates, the proportion of carbonate structural units may be any value at all. The proportion of carbonate groups is preferably up to 100 mol %, in particular up to 80 mol %, especially up to 50 mol %, with respect to the sum of ester groups and carbonate groups. Both the ester fraction and the carbonate fraction of the aromatic polyestercarbonates may be present in the form of blocks or may be distributed statistically within the polycondensate.

The relative solution viscosity ($\eta_{rel}$) of the aromatic polycarbonates and polyester carbonates is in the range 1.18 to 1.4, preferably 1.22 to 1.3 (measured using solutions of 0.5 g of polycarbonate or polyestercarbonate in 100 ml of methylene chloride solution at 25° C.).

The thermoplastic, aromatic polycarbonates and polyestercarbonates may be used separately or as any mixture with each other.

Component B

Component B contains one or more rubber-elastic graft polymers chosen from the group of silicone, acrylate and EP(D)M rubbers as graft substrate.

Component B preferably contains one or more graft polymers of

B.1 5 to 95, preferably 20 to 80, in particular 30 to 80 wt. % of at least one vinyl monomer on B.2 95 to 5, preferably 80 to 20, in particular 70 to 20 wt. % of one or more graft substrates with glass transition temperatures of <10° C., preferably <0° C., in particular <−20° C. selected from the group consisting of silicone, acrylate and EP(D)M rubbers. Graft substrate B.2 generally has an average particle size ($d_{50}$ value) of 0.05 to 5 µm, preferably 0.10 to 0.5 µm, in particular 0.20 to 0.40 µm.

Monomers B.1 are preferably mixtures of

B.1.1 50 to 99, preferably 60 to 80 parts by wt. of vinyl aromatic compounds and/or ring-substituted vinyl aromatic compounds (such as, for example, styrene, α-methylstyrene, p-methylstyrene, p-chlorostyrene) and/or ($C_1$–$C_8$)alkyl methacrylates (such as e.g. methyl methacrylate, ethyl methacrylate) and B.1.2 1 to 50, preferably 40 to 20 parts by wt. of vinyl cyanides (unsaturated nitriles such as acrylonitrile and methacrylonitrile) and/or ($C_1$–$C_8$)alkyl(meth)acrylates (such as e.g. methyl methacrylate, n-butyl acrylate, t-butyl acrylate) and/or derivatives (such as anhydrides and imides) of unsaturated carboxylic acids (for example maleic anhydride and N-phenyl-maleic imide).

Preferred monomers B.1.1 are selected from at least one of the monomers styrene, α-methylstyrene and methyl methacrylate, preferred monomers B.1.2 are selected from at least one of the monomers acrylonitrile, maleic anhydride and methyl methacrylate.

Particularly preferred monomers are B.1.1 styrene and B.1.2 acrylonitrile.

Suitable silicone rubbers B.2 according to the invention consist largely of the structural units

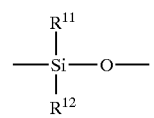

wherein
$R^{11}$ and $R^{12}$ may be identical or different and represent $C_1$–$C_6$ alkyl or cycloalkyl or $C_6$–$C_{12}$ aryl groups.

Preferred silicone rubbers B.2 are particulate with an average particle diameter $d_{50}$ of 0.09 to 1 µm, preferably 0.09 to 0.4 µm, and a gel content of more than 70 wt. %, in particular 73 to 98 wt. % and are obtainable from 1) dihalo-organosilanes
2) 0 to 10 mol %, with respect to 1), of trihalosilanes and
3) 0 to 3 mol %, with respect to 1), of tetrahalosilanes and
4) 0 to 0.5 mol %, with respect to 1) of halotriorganosilanes, wherein the organic groups in compounds 1), 2) and 4) are
α) $C_1$–$C_6$ alkyl or cyclohexyl, preferably methyl or ethyl,
β) $C_6$–$C_{12}$ aryl, preferably phenyl,
γ) $C_1$–$C_6$ alkenyl, preferably vinyl or allyl,
δ) mercapto-$C_1$–$C_6$ alkyl, preferably mercaptopropyl, with the proviso that the sum (γ+δ) is 2 to 10 mol %, with respect to all the organic groups in compounds 1), 2) and 4), and the molar ratio γ:δ=3:1 to 1:3, preferably 2:1 to 1:2.

Preferred silicone rubbers B.2 contain at least 80 mol % of methyl groups as organic groups. The terminal group is generally a diorganyl-hydroxyl-siloxy unit, preferably a dimethylhydroxysiloxy unit.

Preferred silanes 1) to 4) for preparing silicone rubbers B.2 contain chlorine as halogen substituents.

"Obtainable" means that the silicone rubber B.2 does not have to be prepared solely from the halogenated compounds 1) to 4). It is intended that silicone rubbers B.2 of the same structure, which have been prepared from silanes with different hydrolysable groups, such as e.g. $C_1$–$C_6$ alkoxy groups or from cyclic siloxane oligomers, also be included.

Silicone graft rubbers are mentioned as a particularly preferred component B.2. These may be prepared, for example, by a three-stage process.

In the first stage, monomers such as dimethyldichlorosilane, vinylmethyldichlorosilane or dichlorosilanes with other substituents are reacted to give cyclic oligomers (octamethylcyclotetrasiloxane or tetravinyltetramethylcyclotetrasiloxane) which can easily be purified by distillation (see Chemie in unserer Zeit 4 (1987), 121–127).

In the second stage, cross-linked silicone rubbers are obtained from these cyclic oligomers by ring-opening cationic polymerisation with the addition of mercaptopropylmethyldimethoxysilane.

In the third stage, the silicone rubbers obtained, which have graft-active vinyl and mercapto groups, are radical graft polymerised with vinyl monomers (or mixtures).

Mixtures of cyclic siloxane oligomers such as octamethylcyclotetrasiloxane and tetramethyltetravinylcyclotetrasiloxane are preferably polymerised in emulsion in a ring-openig cationic process in the second stage. The silicone rubber is produced as a particulate emulsion.

The process is particularly preferably performed in accordance with GB-PS 1 024 014, using alkylbenzenesulfonic acids which act both as catalyst and as emulsifier. After polymerisation, the acid is neutralised. Instead of alkylbenzenesulfonic acids, n-alkylsulfonic acids may also be used. It is also possible to use additional co-emulsifiers in addition to the sulfonic acid.

Co-emulsifiers may be non-ionic or anionic. Suitable anionic co-emulsifiers are in particular the salts of n-alkylsulfonic or alkylbenzenesulfonic acids. Non-ionic co-emulsifiers are polyoxyethylene derivatives of fatty alcohols and fatty acids. Examples are POE (3)-lauryl alcohol, POE (20)-oleyl alcohol, POE (7)-nonyl alcohol or POE (10)-stearate. (The written form POE (number) . . . alcohol means that the number of ethylene oxide units corresponding to the number stated have been added to one molecule of . . . alcohol. POE stands for polyethylene oxide. The number is an average number).

The cross-linking and graft-active groups (vinyl and mercapto groups, see organic groups γ and δ) may be inserted into the silicone rubber by using appropriate siloxane oligomers. Examples of these are e.g. tetramethyltetravinylcyclotetrasiloxane, or γ-mercaptopropylmethyldimethylsiloxane or its hydrolysate.

They are added to the main oligomer, e.g. octamethylcyclotetrasiloxane, in the required amount in the second, stage.

The incorporation of longer chain alkyl groups, such as e.g. ethyl, propyl or the like or the incorporation of phenyl groups may also be achieved in the same way.

Adequate cross-linking of the silicone rubber may be achieved when groups γ and δ react with each other during emulsion polymerisation, so that the addition of an external cross-linking agent may be unnecessary. However, a cross-linking silane may be added during the second reaction stage in order to increase the degree of cross-linking of the silicone rubber.

Branching and cross-linking may be produced by adding e.g. tetraethoxysilane or a silane of the formula $$y^1\text{—}SiX_3,$$

wherein

X is a hydrolysable group, in particular an alkoxy group or halogen atom and $y^1$ is an organic group.

Preferred silanes $y^1$—SiX$_3$ are methyltrimethoxysilane and phenyltrimethoxysilane.

The gel content is determined at 25° C. in acetone (see DE-AS 2 521 288, col. 6, lines 17 to 37). It is at least 70%, preferably 73 to 98 wt. % in the case of silicone rubbers according to the invention.

rafted silicone rubbers B may be prepared by radical graft polymerisation, for example in the same way as in DE-PS 2 421 288.

To prepare grafted silicone rubbers, the graft monomers are radical graft polymerised, in the third stage, in the presence of the silicone rubber, in particular at 40 to 90° C.

Graft polymerisation may be performed in suspension, dispersion or emulsion. Continuous or batchwise emulsion polymerisation is preferred. This graft polymerisation reaction is performed with radical initiators (e.g. peroxides, azo compounds, hydroperoxides, persulfates, perphosphates) and optionally with the use of anionic emulsifiers, e.g. carboxonium salts, sulfonates, or organic sulfates. The graft polymer is then produced with high graft yields, i.e. a high proportion of polymer formed from the graft monomers is chemically bonded to the silicone rubber. The silicone rubber has graft-active groups so that special measures to encourage a high degree of grafting are superfluous.

The grafted silicone rubbers may be prepared by graft polymerisation of 5 to 95 parts by wt., preferably 20 to 80 parts by wt. of a vinyl monomer or a mixture of vinyl monomers on 5 to 95, preferably 20 to 80 parts by wt. of silicone rubber.

A particularly preferred vinyl monomer is styrene or methyl methacrylate. Suitable mixtures of vinyl monomers consist of 50 to 95 parts by wt. of styrene, α-methylstyrene (or other alkyl or halogen ring-substituted styrenes) or methyl methacrylate on the one hand and of 5 to 50 parts by wt. of acrylonitrile, methacrylonitrile, $C_1$–$C_{18}$ alkyl acrylates, $C_1$–$C_{16}$ alkyl methacrylates, maleic anhydride or substituted maleic imides on the other hand. Further vinyl monomers which may also be present in small amounts are acrylates of primary or secondary aliphatic $C_2$–$C_{10}$ alcohols, preferably n-butyl acrylate or the acrylate or methacrylate of tert.-butyl alcohol, preferably t-butyl acrylate. A particularly preferred monomer mixture contains 30 to 40 parts by wt. of α-methylstyrene, 52 to 62 parts by wt. of methyl methacrylate and 4 to 14 parts by wt. of acrylonitrile.

The silicone rubber grafted in this way may be processed in a known manner, e.g. by coagulating the latices with electrolytes (salts, acids or mixtures thereof) and then purifying and drying.

When preparing the grafted silicone rubbers, free polymers or copolymers of the graft monomers forming the graft layer are generally also formed to a certain extent, in addition to the actual graft copolymer. Here, the product obtained by polymerisation of the graft monomers in the presence of the silicone rubber, thus actually generally including a mixture of graft copolymer and free (co) polymers of the graft monomers, is called the grafted silicone rubber.

Graft polymers based on acrylates are preferably formed from (a) 20 to 90 wt. %, with respect to the graft polymer, of acrylate rubber with a glass transition temperature of less than −20° C. as graft substrate and (b) 10 to 80 wt. %, with respect to the graft polymer, of at least one polymerisable, ethylenically unsaturated monomer (see B.1) as graft monomers.

The acrylate rubbers (a) are preferably polymers of alkyl acrylates, optionally with up to 40 wt. %, with respect to (a), of other polymerisable, ethylenically unsaturated monomers. Preferred polymerisable acrylates include $C_1$–$C_8$ alkyl esters, for example methyl, ethyl, butyl, n-octyl and 2-ethylhexyl esters; halogenated alkyl esters, preferably halogenated $C_1$–$C_8$ alkyl esters, such as chloroethyl acrylate, and mixtures of these monomers.

For cross-linking purposes, monomers with more than one polymerisable double bond are copolymerised. Preferred examples of cross-linking monomers are esters of unsaturated monocarboxylic acids with 3 to 8 carbon atoms and unsaturated monohydric alcohols with 3 to 12 carbon atoms, or saturated polyols with 2 to 4 OH groups and 2 to 20 carbon atoms such as, for example, ethylene glycol dimethacrylate, allyl methacrylate, polyunsaturated heterocyclic compounds such as e.g. trivinyl and triallyl cyanurate; polyfunctional vinyl compounds such as divinyl and trivinyl benzene; or else triallyl phosphate and diallyl phthalate.

Preferred cross-linking monomers are allyl methacrylate, ethylene glycol dimethacrylate, diallyl phthalate and heterocyclic compounds which contain at least 3 ethylenically unsaturated groups.

Particularly preferred cross-linking monomers are the cyclic monomers triallyl cyanurate, triallyl isocyanurate, triacrylohexahydro-s-triazine, triallyl benzene.

The amount of cross-linking monomers used is preferably 0.02 to 5, in particular 0.05 to 2 wt. %, with respect to the rubber substrate.

In the case of cross-linking monomers with at least 3 ethylenically unsaturated groups it is advantageous to restrict the amount to less than 1 wt. % of the rubber substrate.

Preferred "other" polymerisable, ethylenically unsaturated monomers which may optionally be used in addition to acrylates for preparing graft substrate B.2 are e.g. acrylonitrile, styrene, α-methylstyrene, acrylamides, vinyl-$C_1$–$C_6$ alkyl ethers, methyl methacrylate, butadiene. Preferred acrylate rubbers as graft substrate B.2 are emulsion polymers which have a gel content of at least 60 wt. %.

Polymers based on acrylates are generally known and can be prepared by a known process (e.g. EP-A 244 857) or are commercially available products.

The gel content of the graft substrate is determined at 25° C. in a suitable solvent (M. Hoffmann, H. Krömer, R. Kuhn, Polymeranalytik I and II, Georg Thieme-Verlag, Stuttgart, 1977).

The average particle diameter $d_{50}$ is the diameter, above and below which 50 wt. % of the diameters of the particles are found. It can be determined by means of ultracentrifuge measurements (W. Scholtan, H. Lange, Kolloid, Z. und Z. Polymere 250 (1972), 782–796).

At least one copolymer or terpolymer which contains ethylene and propylene and has only a small number of double bonds is used as an EP(D)M graft substrate (see EP-A 163 411, EP-A 244 857).

The EP(D)M rubbers used are those which have a glass transition temperature within the range −60 to 40° C. The rubbers have only a small number of double bonds, i.e. less than 20 double bonds per 1000 carbon atoms, in particular 3 to 10 double bonds per 1000 carbon atoms. Examples of such rubbers are copolymers consisting of ethylene/propylene and ethylene/propylene terpolymers. The latter are prepared by polymerising at least 30 wt. % of ethylene, at least 30 wt. % of propylene and 0.5 to 15 wt. % of a non-conjugated, diolefinic component. The third components used are generally diolefins with at least 5 carbon atoms such as 5-ethylidenenorbornene, dicyclopentadiene, 2,2,1-dicyclopentadiene and 1,4-hexadiene. Furthermore, polyalkylenamers such as polypentenamers, polyoctenamers, polydodecenamers or mixtures of these substances are also suitable. Furthermore, partially hydrogenated polybutadiene rubbers in which at least 70% of the residual double bonds are hydrogenated are also suitable. From among the previously mentioned rubbers, ethylene/propylene copolymers and ethylene/propylene terpolymers (EPDM rubbers) are used in particular. As a rule, EPDM rubbers have a Mooney viscosity $ML_{1-4}$ (100° C.) of 25 to 120. They are commercially available.

Graft polymers based on EP(D)M rubbers may be prepared in a variety of ways. A solution of the EP(D)M elastomer (rubber) in the monomer mixture and (optionally) inert solvents is preferably prepared and the graft reaction is started by radical starters such as azo compounds or peroxides at elevated temperatures. The processes in DE-AS 23 02 014 and DE-OS 25 33 991 may be mentioned by way of example. It is also possible to work in suspension, as described in U.S. Pat. No. 4,202,948.

Component C

Component C contains one or more thermoplastic vinyl (co)polymers C.1 and/or polyalkylene terephthalates C.2.

Vinyl (co)polymers which are suitable for use as C.1 are polymers of at least one monomer from the group of vinyl aromatic compounds, vinyl cyanides (unsaturated nitriles), ($C_1$–$C_8$)alkyl(meth)acrylates, unsaturated carboxylic acids and derivatives (such as anhydrides and imides) of unsaturated carboxylic acids. Particularly suitable (co)polymers are those made from C.1.1 50 to 99, preferably 60 to 80 parts by wt. of vinyl aromatic compounds and/or ring-substituted vinyl aromatic compounds (such as, for example, styrene, α-methylstyrene, p-methylstyrene, p-chlorostyrene) and/or ($C_1$–$C_8$)alkyl(meth)acrylates (such as e.g. methyl methacrylate, ethylmethacrylate), and C.1.2 1 to 50, preferably 20 to 40 parts by wt. of vinyl cyanides (unsaturated nitriles) such as acrylonitrile and methacrylonitrile and/or ($C_1$–$C_8$)alkyl(meth)acrylates (such as e.g. methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenyl-maleic imide).

(Co)polymers C.1 are resinous, thermoplastic and rubber-free.

The copolymer is particularly preferably composed of C.1.1 styrene and C.1.2 acrylonitrile.

(Co)polymers in accordance with C.1 are known and can be prepared by radical polymerisation, in particular by emulsion, suspension, solution or bulk polymerisation. The (co)polymers preferably have molecular weights $\overline{M}_w$, (weight average, determined by light scattering or sedimentation) between 15 000 and 200 000.

(Co)polymers in accordance with component C.1 are frequently produced as secondary products during the graft polymerisation of component B, in particular when large amounts of monomers B.1 are grafted onto small amounts of rubber B.2.

The amounts of C.1 optionally also used according to the invention do not include these secondary products of graft polymerisation of B.

The polyalkylene terephthalates in component C.2 are reaction products of aromatic dicarboxylic acids or their reactive derivatives, such as dimethyl esters or anhydrides, and aliphatic, cycloaliphatic or araliphatic diols and also mixtures of these reaction products.

Preferred polyalkylene terephthalates contain at least 80 wt. %, preferably at least 90 wt. %, with respect to the dicarboxylic acid component, of terephthalic acid groups and at least 80 wt. %, preferably at least 90 wt. %, with respect to the diol component, of ethylene glycol and/or butanediol-1,4 groups.

Preferred polyalkylene terephthalates may contain, in addition to terephthalates, up to 20 mol %, preferably up to 10 mol % of groups from other aromatic or cycloaliphatic dicarboxylic acids with 8 to 14 carbon atoms or aliphatic dicarboxylic acids with 4 to 12 carbon atoms, such as e.g. groups from phthalic acid, isophthalic acid, naphthalene-2, 6-dicarboxylic acid, 4,4'-diphenyldicarboxylic acid, succinic acid, adipic acid, sebacic acid, azelaic acid, cyclohexane-diacetic acid.

Preferred polyalkylene terephthalates may contain, in addition to ethylene glycol or butanediol-1,4 groups, up to 20 mol %, preferably up to 10 mol %, of other aliphatic diols with 3 to 12 carbon atoms or cycloaliphatic diols with 6 to 21 carbon atoms, e.g. groups from propanediol-1,3, 2-ethylpropanediol-1,3, neopentyl glycol, pentanediol-1,5, hexanediol-1,6, cyclohexane-dimethanol-1,4, 3-ethylpentanediol-2,4, 2-methylpentanediol-2,4, 2,2,4-trimethylpentanediol-1,3, 2-ethylhexanediol-1,3, 2,2-diethylpropanediol-1,3, hexanediol-2,5, 1,4-di(β-hydroxyethoxy)benzene, 2,2-bis-(4-hydroxycyclohexyl)-propane, 2,4-dihydroxy-1,1,3,3-tetramethyl-cyclobutane, 2,2-bis-(4-β-hydroxyethoxyphenyl)-propane and 2,2-bis-(4-hydroxypropoxyphenyl)-propane DE-OS 2 407 674. 2 407 776. 2 715 932).

The polyalkylene terephthalates may be branched by incorporating relatively small amounts of trihydric or tetrahydric alcohols or tribasic or tetrabasic carboxylic acids, e.g. in accordance with DE-OS 1 900 270 and U.S. Pat. No. 3,692,744. Examples of preferred branching agents are trimesic acid, trimellitic acid, trimethylolethane and—propane and pentaerythritol.

Particularly preferred polyalkylene terephthalates are those which have been prepared solely from terephthalic acid and its reactive derivatives (e.g. its dialkyl esters) and ethylene glycol and/or butanediol-1,4, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

Preferably used polyalkylene terephthalates generally have an intrinsic viscosity of 0.4 to 1.5 dl/g, preferably 0.5 to 1.2 dl/g, measured in phenol/o-dichlorobenzene (1:1 by weight) at 25° C. in an Ubbelohde viscometer.

Polyalkylene terephthalates can be prepared by known methods (see e.g. Kunststoff-Handbuch, vol. VIII, p. 695 et seq., Carl-Hanser-Verlag, Munich 1973).

Component D

Moulding compositions according to the invention contain, as a flame retardant, at least one phosphonate amine compound of the formula (I)

$$A_{3-y}—N—B_y \quad (I),$$

in which

A represents 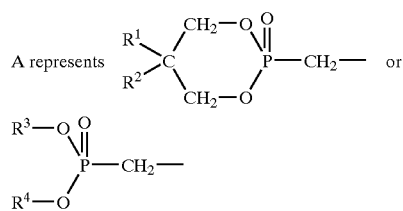 or

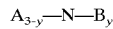

wherein $R^1, R^2, R^3$ and $R^4$ and also B and y are defined in the same way as given above.

B preferably represents, independently, hydrogen, ethyl, n-propyl or iso-propyl, which may be substituted by halogen, or a $C_6$–$C_{10}$ aryl group which is unsubstituted or substituted by a $C_1$–$C_4$ alkyl group or by halogen, in particular phenyl or naphthyl.

Alkyl in $R^1$, $R^2$, $R^3$ and $R^4$ preferably represents, independently, methyl, ethyl, n-propyl, iso-propyl, n-, iso-, sec. or tert.-butyl, pentyl or hexyl.

Substituted alkyl in $R^1$, $R^2$, $R^3$ and $R^4$ preferably represents, independently, a $C_1$–$C_{10}$ alkyl group substituted by halogen, in particular for mono- or di-substituted methyl, ethyl, n-propyl, iso-propyl, n-, iso-, sec. or tert.-butyl, pentyl or hexyl.

$R^3$ and $R^4$, together with the carbon atom to which they are bonded, preferably form cyclopentyl, cyclohexyl, cycloheptyl or cyclooctyl, in particular cyclopentyl or cyclohexyl.

$C_6$–$C_{10}$ aryl in $R^1$, $R^2$, $R^3$ and $R^4$, independently, preferably represents phenyl, naphthyl or binaphthyl, in particular o-phenyl, o-naphthyl, o-binaphthyl, which may be substituted by halogen (in general once, twice or three times).

The following are mentioned byway of example and for preference: 5,5,5',5',5",5"-hexamethyl-tris-(1,3,2-dioxaphosphorinane-methane)amino-2,2',2"-trioxide of the formula (I-1)

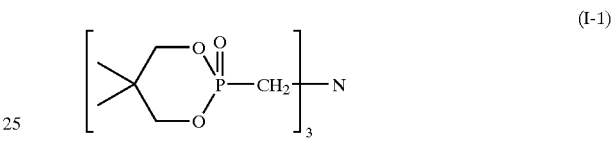

(I-1)

(trial product XPM 1000, from Solutia Inc., St Louis, USA)

1,3,2-dioxaphosphorinane-2-methanamine, N-butyl-N [(5,5-dimethyl-1,3,2-dioxaphosphorinan-2-yl)methyl]-5,5-dimethyl-, P,2-dioxide; 1,3,2-dioxaphosphorinane-2-methanamine, N-[(5,5-dimethyl-1,3,2-dioxaphosphorinan-2-yl)-methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)-methyl]-N-ethyl-5,5-dimethyl-, P,2-dioxide, 1,3,2-dioxa-phosphorinane-2-methanamine, N-butyl-N-[(5,5-di-chloromethyl-1,3,2-dioxaphosphorinan-2-yl)-methyl]-5,5-di-chloromethyl-, P,2-dioxide, 1,3,2-dioxa-phosphorinane-2-methanamine, N-[(5,5-di-chloromethyl-1,3,2-dioxaphosphorinan-2-yl)-methyl]-5,5-di-chloromethyl-N-phenyl-, P,2dioxide;1,3,2-dioxaphosphorinane-2-methanamine, N,N-di-(4-chlorobutyl)-5,5-dimethyl-2-oxide; 1,3,2-dioxaphosphorinane-2-methanimine, N-[(5,5-dimethyl-1,3,2-dioxaphosphorinan-2-yl)-methane]-N-(2chloroethyl)-5,5di-(chloromethyl)-, P2-dioxide.

Also preferred are:

compounds of the formula (I-2) or (I-3)

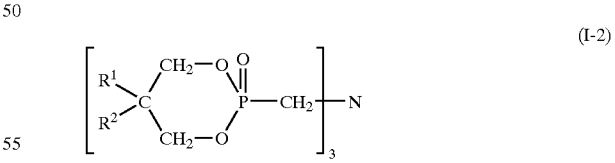

(I-2)

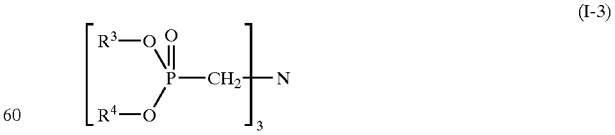

(I-3)

wherein $R^1$, $R^2$, $R^3$ and $R^4$ are defined in the same way as above.

Compounds of the formula (I-2) and (I-1) are particularly preferred. The individual compounds mentioned above are also particularly preferred.

Compounds of the formula (I) can be prepared by the following process:

a) PCl$_3$ is added to a mixture of 1,3-diol derivatives, water and an organic solvent at a temperature of 10–60° C. A 5,5-disubstituted 1,3,2-dioxaphosphorinane-2-oxide of the formula (Ia) is obtained

wherein R$^1$ and R$_2$ are defined in the same way as above, b) after purification, the 1,3,2-dioxaphosphorinane-2-oxide is reacted, in paraformaldehyde, with an amine B$_y$NH$_{3-y}$, wherein B and y are defined in the same way as above, c) after purifying again and drying, the phosphonate amine of the formula (I) is obtained.

A detailed description of the method of preparation can be found in U.S. Pat. No. 5,844,028.

Component E

Fluorinated polyolefins E have high molecular weights and have glass transition temperatures higher than –30° C., generally higher than 100° C., and fluorine contents of preferably 65 to 76, in particular 70 to 76 wt. %, average particle diameters d$_{50}$ of 0.05 to 1 000, preferably 0.08 to 20 μm. Fluorinated polyolefins E generally have a density of 1.2 to 2.3 g/cm$^3$. Preferred fluorinated polyolefins E are polytetrafluoroethylene, polyvinylidene fluoride, tetrafluoroethylene/hexafluoropropylene and ethylene/tetrafluoroethylene copolymers. The fluorinated polyolefins are known (see "Vinyl and Related Polymers" by Schildknecht, John Wiley & Sons, Inc., New York, 1962, pages 484—494; "Fluorpolymers" by Wall, Wiley-Interscience, John Wiley & Sons, Inc., New York, vol. 13, 1970, pages 623–654; "Modem Plastics Encyclopedia", 1970–1971, vol. 47, no. 10A, October 1970, McGraw-Hill, Inc., New York, pages 134 and 774; "Modem Plastics Encyclopedia", 1975–1976, October 1975, vol. 52, no. 10A, McGraw-Hill, Inc., New York, pages 27, 28 and 472 and U.S. Pat. No. 3,671,487, 3,723,373 and 3,838,092).

They can be prepared by known processes, that is, for example, by polymerising tetrafluoroethylene in aqueous medium with a free radical-producing catalyst, for example sodium, potassium or ammonium peroxydisulfate, at pressures of 7 to 71 kg/cm$^2$ and at temperatures of 0 to 200° C., preferably at temperatures of 20 to 100° C. (For more details, see e.g. U.S. Pat. No. 2,393,967). Depending on the initial form, the density of these materials is between 1.2 and 2.3 g/cm$^3$ and the average particle size is between 0.5 and 1 000 μm.

According to the invention, preferred fluorinated polyolefins E are tetrafluoroethylene polymers with average particle diameters of 0.05 to 20 μm, preferably 0.08 to 10 μm, and a density of 1.2 to 1.9 g/cm$^3$ and are preferably used in the form of a coagulated mixture of emulsions of tetrafluoroethylene polymer E and emulsions of the graft polymer.

Further preparations which are preferred according to the invention are fluorinated polyolefins E:

E.1) as a coagulated mixture with at least one of components A to C, wherein the fluorinated polymer E or polyolefin mixture as an emulsion is mixed with at least one emulsion of the components A to C and is then coagulated or E.2) as a pre-compound with at least one of components A to C, wherein the fluorinated polyolefin E as a powder is mixed with a powder or granules of at least one of the components A to C and is compounded in the molten state, in general at temperatures of 208° C. to 330° C. in conventional equipment such as internal compounders, extruders or twin-shaft screws.

Preferred preparations of fluorinated polyolefin E are coagulated mixtures with a graft polymer B or a vinyl (co)polymer C.

Fluorinated polyolefins E which are suitable for use in powdered form are tetrafluoroethylene polymers with average diameters of 100 to 1 000 μm and densities of 2.0 g/cm$^3$ to 2.3 g/cm$^3$.

To prepare a coagulated mixture of a graft polymer and component E, an aqueous emulsion (latex) of a graft polymer B is first mixed with a finely divided emulsion of a tetrafluoroethylene polymer E; suitable tetrafluoroethylene polymer emulsions normally have solids contents of 30 to 70 wt. %, preferably 50 to 60 wt. %, in particular 30 to 35 wt. %.

The data relating to amounts in the description of components A, B and C does not contain the proportion of graft polymer, vinyl (co)polymer or polycarbonate for the coagulated mixture in accordance with E.1) and E.2).

The ratio by weight of graft polymer B or (co)polymer to fluorinated polyolefin E in the emulsion mixture is 95:5 to 60:40, preferably 90:10 to 50:50. Then, the emulsion mixture is coagulated in a known manner, for example by spray-drying, freeze-drying or coagulation by means of adding inorganic or organic salts, acids, bases or water-miscible organic solvents such as alcohols or ketones, preferably at temperatures of 20 to 150° C., in particular 50 to 100° C. If required, the mixture may be dried at 50 to 200° C., preferably 70 to 100° C.

Suitable tetrafluoroethylene polymer emulsions are commercially available products and are sold, for example, by DuPont as Teflon® 30 N.

Moulding compositions according to the invention may contain at least one of the conventional additives such as lubricants and mould-release agents, nucleating agents, antistatic agents, stabilisers or colorants and pigments.

Moulding compositions according to the invention may contain up to 35 wt. %, with respect to the entire moulding composition, of a further, optionally synergistic, flame retardant. Examples of further flame retardants which may be mentioned are organic phosphorus compounds such as triphenyl phosphate or m-phenylene-bis-(diphenylphosphate), organic halogenated compounds such as decabromobisphenyl ether, tetrabromobisphenol, inorganic halogen compounds such as ammonium bromide, nitrogen compounds such as melamine, melamine/formaldehyde resins, inorganic hydroxide compounds such as Mg or Al hydroxide, inorganic compounds such as antimony oxides, hydroxoantimonate, zirconium oxide, zirconium hydroxide, molybdenum oxide, ammonium molybdate, zinc borate, ammonium borate, barium metaborate, talc, silicate, silicon oxide and tin oxide and also siloxane compounds.

Furthermore, phosphorus compounds of the formula (VI) are suitable as flame retardants,

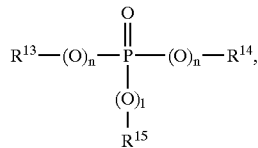

in which
R$^{13}$, R$^{14}$ and R$^{15}$, independently, represent an optionally halogenated C$_1$–C$_8$ alkyl or an optionally halogenated and/or alkylated C$_5$ or C$_6$ cycloalky or an optionally halogenated and/or alkylated and/or aralkylated C$_6$–C$_{30}$ aryl group and "n" and "l", independently, are 0 or 1.

These phosphorus compounds are generally known (see for example, Ullmann, Enzyklopädie der technischen Chemie, vol. 18, pages 301 et seq., 1979 and EP-A 345 522). Aralkylated phosphorus compounds are described, for example, in DE-OS 38 24 356.

Optionally halogenated C$_1$–C$_8$ alkyl groups in accordance with (VI) may contain one or more halogen atoms and be linear or branched. Examples of alkyl groups are chloroethyl, 2-chloropropyl, 2,3-dibromopropyl, butyl, methyl or octyl.

Optionally halogenated and/or alkylated C$_5$ or C$_6$ cycloalkyl groups in accordance with (VI) are optionally singly or multiply halogenated and/or alkylated C$_5$ or C$_6$ cycloalkyl groups, that is e.g. cyclopentyl, cyclohexyl, 3,3,5-trimethylcyclohexyl and fully chlorinated cyclohexyl.

Optionally halogenated and/or alkylated and/or aralkylated C$_6$–C$_{30}$ aryl groups in accordance with (VI) are optionally mononuclear or polynuclear, singly or multiply halogenated and/or alkylated and/or aralkylated groups, e.g. chlorophenyl, bromophenyl, pentachlorophenyl, pentabromophenyl, phenyl, cresyl, isopropylphenyl, benzyl-substituted phenyl and naphthyl.

R$^{13}$, R$^{14}$ and R$^{15}$ preferably represent, independently, methyl, ethyl, butyl, octyl, phenyl, cresyl, cumyl or naphthyl. R$^{13}$, R$^{14}$ and R$^{15}$, independently, represent in particular methyl, ethyl or butyl or phenyl which is optionally substituted by methyl and/or ethyl.

Phosphorus compounds in accordance with formula (VI) which may be used according to the invention are e.g. tributyl phosphate, tris-(2-chloroethyl)phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, tris-(p-benzylphenyl) phosphate, triphenylphosphine oxide, dimethyl methanephosphonate, dipentyl methanephosphonate and diethyl phenylphosphonate.

Suitable flame retardants are also dimeric and oligomeric phosphates such as are described, for example, in EP-A-0 363 608.

Moulding compositions according to the invention may also contain phosphorus compounds in accordance with formula (VII) as flame retardants

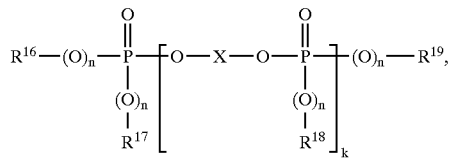

In the formula, R$^{16}$, R$^{17}$, R$^{18}$ and R$^{19}$, independently, each represent optionally halogenated C$_1$–C$_8$ alkyl, C$_5$–C$_6$ cycloalkyl, C$_6$–C$_{20}$ aryl or C$_7$–C$_{12}$ aralkyl groups.

R$^{16}$, R$^{17}$, R$^{18}$ and R$^{19}$, independently, preferably represent C$_1$–C$_4$ alkyl, phenyl, naphthyl or phenyl-C$_1$–C$_4$-alkyl groups. Aromatic groups R$^{16}$, R$^{17}$, R$^{18}$ and R$^{19}$ may for their part be substituted with halogen atoms and/or alkyl groups, preferably chlorine, bromine and/or C$_1$–C$_4$ alkyl groups. Particularly preferred aryl groups are cresyl, phenyl, xylenyl, propylphenyl or butylphenyl and also the corresponding brominated and chlorinated derivatives thereof.

X in formula (VII) represents a mononuclear or polynuclear aromatic group with 6 to 30 carbon atoms. This is preferably derived from diphenols of the formula (III). Diphenylphenol, bisphenol A, resorcinol or hydroquinone or their chlorinated or brominated derivatives are particularly preferred.

n in formula (VII) may, independently, be 0 or 1; n is preferably equal to 1.

k has a value from 0 to 30 and preferably has an average value from 0.3 to 20, in particular 0.5 to 10, specifically 0.5 to 6.

Mixtures of 10 to 90 wt. %, preferably 12 to 40 wt. %, of at least one monophosphorus compound of the formula (VI) and at least one oligomeric phosphorus compound, for example a mixture of oligomeric phosphorus compounds such as those described in EP-A-363 608 and phosphorus compounds in accordance with formula (VII) in amounts of 10 to 90 wt. %, preferably 60 to 88 wt. %, with respect to the total amount of phosphorus compounds, may also be used.

Monophosphorus compounds of the formula (VI) are in particular tributyl phosphate, tris-(2-chloroethyl)phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, halogen-substituted aryl phosphates, dimethyl methylphosphonate, diphenyl methylphosphonate and diethyl phenylphosphonate, triphenylphosphine oxide or tricresylphosphine oxide.

The mixtures of monomeric and oligomeric phosphorus compounds of the formula (VII) have average k values of 0.3 to 20, preferably 0.5 to 10, in particular 0.5 to 6.

The phosphorus compounds mentioned are known (e.g. EP-A-363 608, EP-A 640 655) or can be prepared in a similar manner by known methods (e.g. Ullmanns Encyklopädie der technischen Chemie, vol. 18, p. 301 et seq., 1979; Houben-Weyl, Methoden der organischen Chemie, vol. 12/1, p. 43; Beilstein vol. 6, p. 177).

Moulding compositions according to the invention containing components A to E and optionally further known additives such as stabilisers, colorants, pigments, lubricants and mould release agents, nucleating agents and antistatic agents, are prepared by mixing the relevant constituents in a known manner and melt compounding and melt extruding at temperatures of 200° C. to 300° C. in conventional equipment such as internal compounders, extruders and twin-shaft screws, wherein component E is preferably used in the form of the coagulated mixture mentioned above.

Mixing the individual constituents may take place in a known manner either in sequence or simultaneously, in fact either at about 20° C. (room temperature) or at a higher temperature.

The invention therefore also provides a process for preparing the moulding compositions.

Due to their exceptional flame resistance and good mechanical properties, thermoplastic blends according to the invention are suitable for producing moulded articles of any type, in particular those with high demands relating to resistance to breaking and resistance to chemicals.

Blends according to the present invention may be used to produce moulded articles of any type. In particular, moulded articles may be produced by injection moulding. Examples of moulded articles which can be produced are: housing sections of any type, e.g. for domestic equipment such as juice presses, coffee machines, mixers, for office machines such as monitors, printers, copiers or cladding for the construction sector and parts for the car sector. They can also be used in the electrical engineering area because they have very good electrical properties.

Furthermore, blends according to the invention may be used, for example, to produce the following moulded articles or moulded parts:

Internal structural parts for rail vehicles, hub caps, housings for electrical equipment containing small transformers, housings for equipment for information distribution and transmission, housings and covers for medical purposes, massage equipment and housings therefor, toy vehicles for children, two-dimensional wall panels, housings for safety devices, rear spoilers, thermally insulated transport containers, devices for housing or caring for small animals, moulded parts for sanitary and bath fittings, cover grids for ventilation openings, moulded parts for summerhouses and garden sheds, housings for garden equipment.

Another form of processing is the production of moulded articles by thermoforming from previously produced sheets or films.

Therefore, the present invention also provides use of blends according to the invention to produce moulded articles of any type, preferably the articles mentioned above, and the moulded articles made from moulding compositions according to the invention.

EXAMPLES

Component A

Linear polycarbonate based on bisphenol A with a relative solution viscosity of 1.252 measured in $CH_2Cl_2$ as solvent at 25° C. and at a concentration of 0.5 g/100 ml.

Component B

B.1 Silicone Graft Rubber

1. Preparing the Silicone Rubber Emulsion 38.4 parts by wt. of octamethylcyclotetrasiloxane, 1.2 parts by wt. of tetramethyltetravinylcyclotetrasiloxane and 1 part by wt. of mercaptopropylmethyldimethoxysilane are stirred together. 0.5 parts by wt. of dodecylbenzenesulfonic acid are added, then 58.4 parts by wt. of water are added over the course of one hour. The mixture is intensively stirred. The pre-emulsion is homogenised twice at 200 bar, using a high pressure emulsifying machine. Another 0.5 parts by wt. of dodecylbenzenesulfonic acid are added. The emulsion is stirred for 2 hours at 85° C. and then for 36 hours at 20° C. The mixture is neutralised using 5N NaOH. A stable emulsion with a solids content of about 36 wt. % is obtained. The polymer has a gel content of 82 wt. %, measured in toluene; the average particle diameter $d_{50}$ is 300 nm.

2. Preparing the Grafted Silicone Rubber

The following are initially introduced into a reactor:

2107 parts by wt. of latex according to 1) and 1073 parts by wt. of water

After initiating reaction with a solution of 7.5 parts by wt. of potassium peroxydisulfate in 195 parts by wt. of water at 65° C., each of the following solutions are supplied uniformly over the course of 4 hours in order to prepare the graft rubber:

Solution 1: 540 parts by wt. of styrene and 210 parts by wt. of acrylonitrile;

Solution 2: 375 parts by wt. of water and 15 parts by wt. of the sodium salt of $C_{14}$–$C_{18}$ alkylsulfonic acids.

Then the mixture is polymerised for 6 hours at 65° C. A latex with a solids content of about 33 wt. % is obtained.

After coagulation with an aqueous magnesium chloride/acetic acid solution, filtration and drying under vacuum, the graft polymers are obtained in the form of a white powder.

B.2 Acrylate Graft Rubber

A graft polymer of 40 parts by wt. of a copolymer of styrene and acrylonitrile in the ratio of 72:28 on 60 parts by wt. of particulate cross-linked polyacrylate rubber (mean particle diameter $d_{50}$=0.5 µm) prepared by emulsion polymerisation.

B.3 EPDM Graft Rubber

Graft polymer of 50 parts by wt. of a copolymer of styrene and acrylonitrile in the ratio of 72:28 on 50 parts by wt. of cross-linked EPDM rubber from the Uniroyal Chemical Company, commercial name Royaltuf 372 P20.

B.4 Graft polymer of 45 parts by wt. of a copolymer of styrene and acrylonitrile in the ratio of 72:28 on 55 parts by wt. of particulate cross-linked polybutadiene rubber (mean particle diameter $d_{50}$=0.40 µm), prepared by emulsion polymerisation.

Component C

Styrene/acrylonitrile copolymer with a styrene/acrylonitrile ratio by weight of 72:28 and an intrinsic viscosity of 0.55 dl/g (measured in dimethylformamide at 20° C.).

Component D

A phosphonate amine of the formula

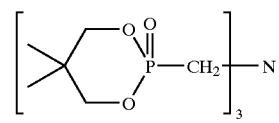

(XPM 1000 development product from Solutia Inc., St Louis, Mo.).

Component E

Batch SAN/Teflon in the ratio by weight of 1:1: Blendex 446, General Electric, N.Y. USA.

Preparing and Testing Moulding Compositions According to the Invention

The components were mixed in a 3 1 internal compounder. The moulded articles were prepared at 260° C. on an injection moulding machine of the Arburg 270 E type.

The heat resistance according to Vicat B was determined in accordance with DIN 53 460 (ISO 306) using rods with the dimensions 80×10×4 mm.

The stress crack behaviour (ESC behaviour) was investigated using rods with the dimensions 80×10×4 mm, processing temperature 260° C. A mixture of 60 vol. % toluene and 40 vol. % isopropanol was used as the test medium. The specimens were pre-stretched using an arc-shaped jig (pre-stretching as a percentage) and stored at room temperature in the test medium. The stress crack behaviour is assessed by the production of cracks or a fracture, as a function of the pre-stretching in the test medium.

The MVI (240/5) [cm³/10 min] was measured in accordance with ISO 1133.

The viscosity was measured in accordance with DIN 54 811.

As can be seen from the table given below, moulding compositions according to the invention are characterised by a beneficial combination of properties consisting of flame-resistance and mechanical properties. Surprisingly, the fundamental rubber characteristics of notched impact resistance and ESC behaviour, which is a measure of the resistance to chemicals, are modified when compared with the prior art (diene rubber) and crucially improved. In the resistance to stress crack test, the moulding compositions according to the invention withstood fracturing for substantially longer, which is important for critical applications (arts with complicated geometries).

TABLE

Moulding compositions and their properties

| Example | 1 | 2 | 3 | 4 comparison |
|---|---|---|---|---|
| Components (parts by wt.) A | 67.60 | 67.60 | 67.60 | 67.60 |
| B.1 | 10.50 | — | — | — |
| B.2 | — | 10.50 | — | — |
| B.3 | — | — | 10.50 | — |
| B.4 | — | — | — | 10.50 |
| C | 8.80 | 8.80 | 8.80 | 8.80 |
| D | 11.90 | 11.90 | 11.90 | 11.90 |
| E | 0.8 | 0.8 | 0.8 | 0.8 |
| Mould release agent | 0.4 | 0.4 | 0.4 | 0.4 |
| Properties | | | | |
| Vicat B 120 (ISO 306) (° C.) | 116 | 116 | 116 | 116 |
| ESC behaviour Fracture at $\epsilon_x$ (%) | AL* 2.4 (10 min) | 2.4 (5 min) | 2.4 (5 min) | 2.0 (5 min) |
| UL 94V 3.2 mm | V-0 | V-0 | V-0 | V-0 |
| MVI [cm³/10 min] | 12.8 | 25.0 | 15.0 | 12.2 |
| Viscosity function 260° C./1500 s⁻¹ | 116.7 | 94.1 | 90.3 | 117.4 |

*AL = attacked

What is claimed is:

1. Blends which contain

A) polycarbonate and/or polyestercarbonate,

B) at least one rubber-elastic graft polymer, selected from the group consisting of silicone, EP(D)M and acrylate rubbers as graft substrate, C) optionally, at least one thermoplastic polymer, selected from the group consisting of C.1 vinyl (co)polymers and C.2 polyalkylene terephthalates and D) 0.1 to 30 parts by wt. (with respect to the entire mixture) of a phosphonate amine of the general formula (I)

 (I), in which

A represents a group of the formula (IIa)

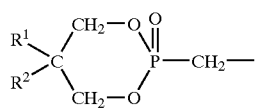

or (IIb)

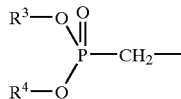

R¹ and R2, independently, represent an unsubstituted or substituted $C_1$–$C_{10}$ alkyl group or an unsubstituted or substituted C6–$C_{10}$ aryl group, R³ and R⁴, independently, represent an unsubstituted or substituted $C_1$–$C_{10}$ alkyl group or an unsubstituted or substituted $C_6$–$C_{10}$ aryl group or R³ and R⁴ together represent an unsubstituted or substituted $C_3$–$C_{10}$ alkylene group, y has the numerical value 0, 1 or 2 and B independently, represents hydrogen, an optionally halogenated $C_2$–C8 alkyl group, or an unsubstituted or substituted $C_6$–$C_{10}$ aryl group.

2. Blends in accordance with claim 1, containing

40–99 parts by wt. of component A, 0.5–60 parts by wt. of component B,

0–45 parts by wt. of component C, 0.1–25 parts by wt. of component D, and

0–5 parts by wt. of a fluorinated polyolefin.

3. Blends according to claim 2 containing 2 to 20 parts by wt. of D.

4. Blends according to claim 1 wherein component B) is at least one graft polymer selected from the group consisting of B.1 5 to 95 wt. % of at least one vinyl monomer on B.2 95 to 5 wt. % of one or more graft substrates with glass transition temperatures of <10° C. selected from the group consisting of silicone, acrylate and EP(D)M rubbers.

5. Blends according to claim 4, wherein vinyl monomers B.1 are selected from:

B.1.1 50 to 99 parts by wt. of at least one member selected from the group consisting of vinyl aromatic compounds, ring-substituted vinyl aromatic compounds, and $C_1$–$C_8$ alkyl methacrylates, and B.1.2 1 to 50 parts by wt. of at least one member selected from the group consisting of vinyl cyanides, $C_1$–$C_8$ alkyl(meth)acrylates, anhydrides of unsaturated carboxylic acids, and imides of unsaturated carboxylic acids.

6. Blends according to claim 5, wherein

B.1.1 is at least one member selected from the group consisting of styrene, α-methylstyrene and methyl methacrylate and B.1.2 is at least one member selected from the group consisting of acrylonitrile, methacrylonitrile, maleic anhydride and methyl methacrylate.

7. Blends according to claim 1 wherein component C.1 consists of vinyl (co)polymers prepared from at least one monomer selected from the group consisting of vinyl aromatic compounds, vinyl cyanides, $C_1$–$C_8$ alkyl(meth)acrylates, unsaturated carboxylic acids, anhydrides of unsaturated carboxylic acids, and imides of unsaturated carboxylic acids.

8. Blends according to claim 1 wherein phosphonate amine is a member selected from the group consisting of 5,5,5',5',5",5"-hexamethyl-tris-(1,3,2-dioxaphosphorinane-methane)-amino-2,2',2"-trioxide, 1,3,2- dioxaphosphorinane-2-methanamine, N-butyl-N[(5,5-dimethyl-1,3,2-dioxaphosphorinan-2-yl)-methyl]-5,5-dimethyl-, P,2-dioxide; 1,3,2-dioxaphosphorinane-2-methanamine, N-[(5,5-dimethyl-1,3,2-dioxaphosphorinan-2-yl)-methyl]-5,5-dimethyl-N-phenyl- P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)-methyl]-N-ethyl-5,5-dimethyl-, P,2-dioxide, 1,3,2-dioxa-phosphorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxa-phosphorinane-2-methanamine, N-[(5,5-di-chloromethyl-1,3,2-dioxa-phosphorinan-2-yl)-methyl]-5,5-di-chloromethyl-N-phenyl-, P,2-dioxide; 1,3,2-dioxaphosphorinane-2-methanamine, N,N-di-(4-chlorobutyl)-5,5-dimethyl-2-oxide; 1,3,2-dioxaphosphorinane-2-methanimine and N-[(5,5-dimethyl-1,3,2-dioxaphosphorinan-2-yl)-methane]-N-(2-chloroethyl)-5,5-di-(chloromethyl)-, P2-dioxide.

9. Blends according to claim 1 further containing at least one additive selected from the group consisting of lubricants, mould release agents, nucleating agents, antistatic agents, stabilisers, colorants and pigments.

10. Blends according to claim 1 further containing a flame retardant which is different from component D.

11. A method of using the blend of claim 1 comprising producing a molded article.

12. A molded article comprising the blend of claim 1.

* * * * *

UNITED STATES PATENT AND TRADEMARK OFFICE
CERTIFICATE OF CORRECTION

PATENT NO. : 6,784,232 B1
DATED : August 31, 2004
INVENTOR(S) : Michael Zobel et al.

It is certified that error appears in the above-identified patent and that said Letters Patent is hereby corrected as shown below:

Column 20,
Line 10, delete "R2" and insert -- $R^2$ --.
Line 12, delete "C6-C$_{10}$ aryl group" and insert -- $C_6$-$C_{10}$ aryl group --.
Line 20, delete "$C_2$-C8 alkyl group" and insert -- $C_2$-$C_8$ alkyl group --.

Signed and Sealed this

Twenty-ninth Day of March, 2005

JON W. DUDAS
*Director of the United States Patent and Trademark Office*